(12) United States Patent  (10) Patent No.: US 8,447,845 B1
Scott et al.  (45) Date of Patent: May 21, 2013

(54) SETTING A NETWORK DEVICE TO DEFAULT SETTINGS

(75) Inventors: Jeffrey S. Scott, Goleta, CA (US); Marinus C. De Jong, Goleta, CA (US)

(73) Assignee: Flir Systems, Inc., Wilsonville, OR (US)

( * ) Notice: Subject to any disclaimer, the term of this patent is extended or adjusted under 35 U.S.C. 154(b) by 296 days.

(21) Appl. No.: 13/024,861

(22) Filed: Feb. 10, 2011

(51) Int. Cl.
*G06F 15/177* (2006.01)

(52) U.S. Cl.
USPC .......................................................... 709/220

(58) Field of Classification Search ............ 709/220
See application file for complete search history.

(56) References Cited

U.S. PATENT DOCUMENTS

| | | | |
|---|---|---|---|
| 4,862,355 A | 8/1989 | Newman et al. | |
| 5,323,393 A | 6/1994 | Barrett et al. | |
| 5,647,056 A | 7/1997 | Barrett et al. | |
| 6,087,835 A | 7/2000 | Haneda | |
| 7,167,926 B1 | 1/2007 | Boucher et al. | |
| 7,366,964 B2 * | 4/2008 | Frodsham et al. | 714/716 |
| 7,516,033 B2 * | 4/2009 | Smith et al. | 702/90 |
| 7,689,738 B1 | 3/2010 | Williams et al. | |
| 7,710,888 B2 * | 5/2010 | DelRegno et al. | 370/249 |
| 2005/0160139 A1 | 7/2005 | Boucher et al. | |
| 2005/0222815 A1 * | 10/2005 | Tolly | 702/185 |
| 2006/0067295 A1 | 3/2006 | Lehotsky et al. | |
| 2007/0230360 A1 | 10/2007 | Nishi et al. | |
| 2008/0002718 A1 | 1/2008 | Bernard et al. | |
| 2009/0193215 A1 | 7/2009 | Rogers | |

FOREIGN PATENT DOCUMENTS

JP   2007/060363   3/2007

OTHER PUBLICATIONS

AirStream Wireless Modem, Rice Lake Weighing Systems, Feb. 2002, 120 Pages.

* cited by examiner

*Primary Examiner* — Chi Pham
*Assistant Examiner* — Stephen B Gwanvoma
(74) *Attorney, Agent, or Firm* — Haynes and Boone, LLP

(57) ABSTRACT

Systems, apparatus, and methods are disclosed herein to provide default settings for a network device. For example, a network device includes a memory, and a processor that is configured to: transmit an outgoing signal through a network connector; receive the outgoing signal via the network connector; and set the network device to default settings after receiving the outgoing signal.

20 Claims, 7 Drawing Sheets

SETTING A NETWORK DEVICE TO DEFAULT SETTINGS

TECHNICAL FIELD

The present disclosure relates generally to network devices and, more particularly, to configuring network devices with desired settings.

BACKGROUND

Network devices such as, for example, network camera systems or other devices, have factory default settings for the network interface and/or for configuring other device default settings. End-users may change default settings to suit their particular installation needs which override the default settings of the device. Often, through mis-configuration, a system may be configured to perform poorly, less efficiently, and/or even to be non-functional. In particular, some network devices, such as cameras, can be set to leave the camera inaccessible and/or require advanced network expertise to recover the camera, which may lead to extensive customer support costs.

As a result, there is a need for an improved approach to device configuration that reduces the cost associated with existing techniques and systems.

SUMMARY

In accordance with one embodiment of the present disclosure, a network device includes a memory, and a processor that is configured to: transmit an outgoing signal through a network connector; receive the outgoing signal via the network connector; and set the network device to default settings after receiving the outgoing signal.

In accordance with another embodiment of the present disclosure, a system for setting a network device to default settings is disclosed. The system has a network device including a network connector for connecting to a network, and a loopback element configured to return an outgoing signal from the network device back to the network device. The network device is configured to receive the returned outgoing signal from the loopback element and to subsequently set the network device to default settings.

In accordance with another embodiment of the present disclosure, a method for setting a network device to default settings includes transmitting an outgoing signal from a network device, receiving the outgoing signal back at the network device via a loopback element, and setting the network device to default settings after receiving the outgoing signal at the network device.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
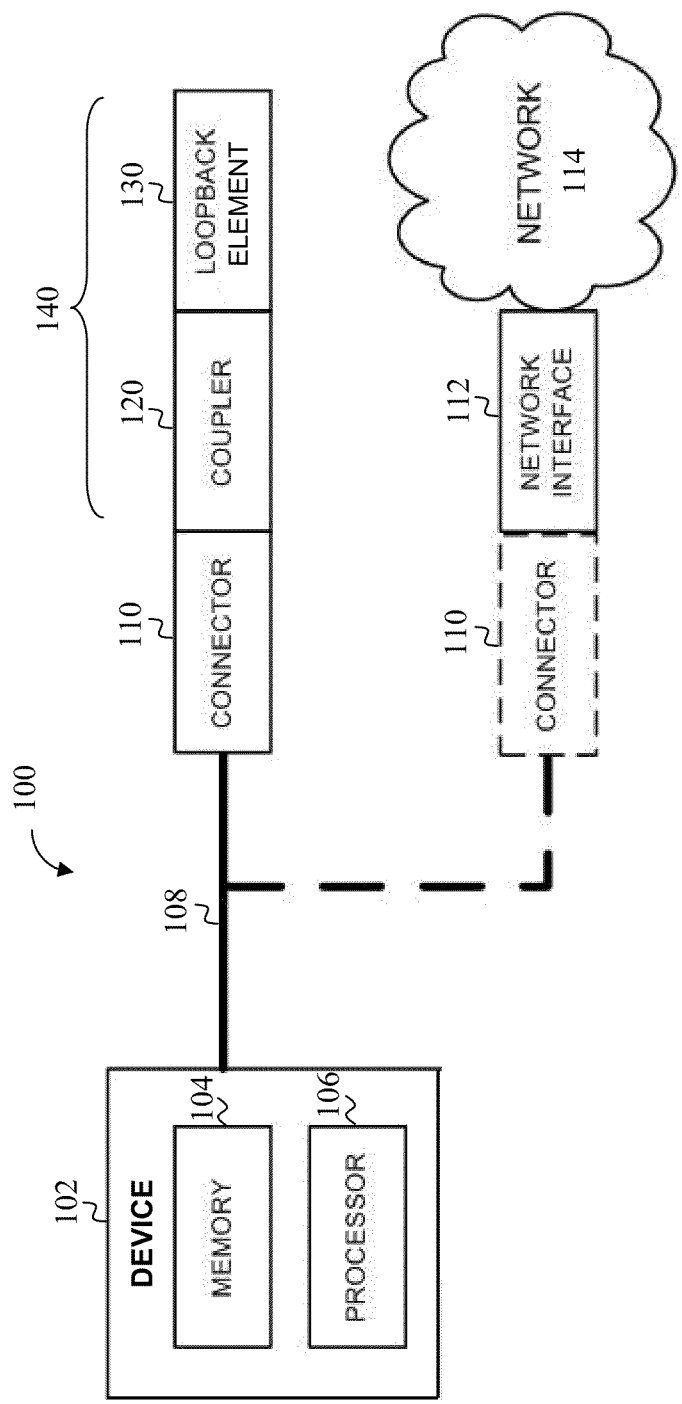
FIGS. 1A and 1B illustrate block diagrams of systems for setting a network device to default settings in accordance with embodiments of the present disclosure.
Figure 1B:
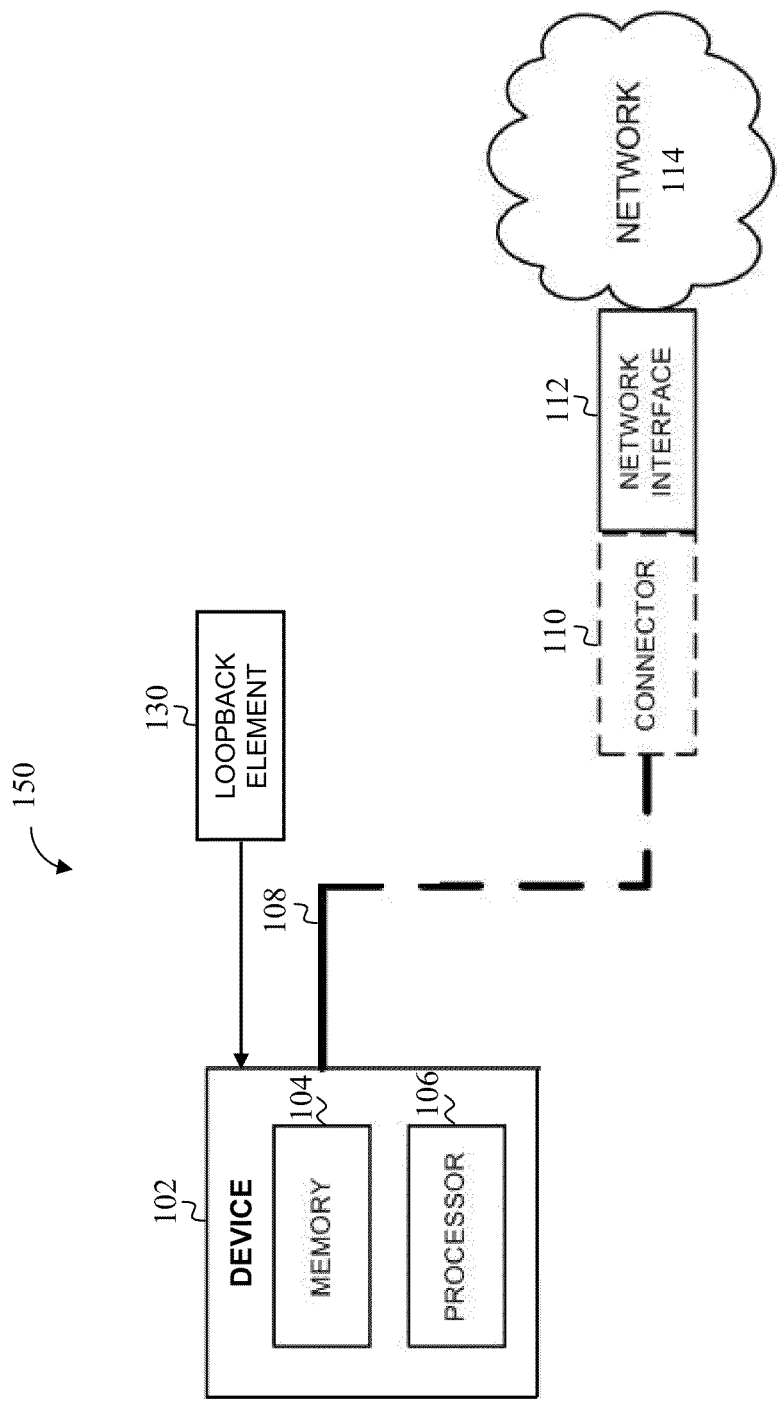

FIGS. 1A and 1B illustrate block diagrams of a system 100 and a system 150, respectively, for setting a network device to default settings in accordance with embodiments of the present disclosure. Systems 100 and 150 each include a network device 102 that may be operably coupled to a network 114 via a network connector 110 and a network interface 112. Network connector 110 may be operably coupled to network device 102 by an appropriate wire 108. In one example, network connector 110 may include a male RJ-45 connector or plug and network interface 112 may include a female RJ-45 port operably coupled to network 114.

System 100 further includes a loopback apparatus 140 that includes a coupler 120 adapted to operably interface with network connector 110, and a loopback element 130 configured to return an outgoing signal from network device 102 back to the network device 102 through the coupler 120 and connector 110 to set the network device to default settings.

System 150 further includes a loopback element 130 adapted to directly interface with network device 102 (e.g., without a connector 110 and coupler 120) and configured to return an outgoing signal from network device 102 back to the network device to set the network device to default settings.

In one example, network 114 includes one of the Internet, a cellular network, a local area network (LAN), and/or a wide area network (WAN). Various networks are applicable and within the scope of the present disclosure.

In one embodiment, network device 102 includes a memory 104 and a processor 106. In various embodiments, processor 106 may comprise any type of a processor or a logic device (e.g., a programmable logic device (PLD) configured to perform processing functions). Processor 106 may be adapted to interface and communicate with memory and other components to perform method and processing steps and/or operations, as described herein such as setting or resetting device default settings, comparing outgoing signals with incoming signals, checking incoming signals for unique packets (e.g., loopback packets), controlling biasing and other functions (e.g., values for elements such as variable resistors and current sources, switch settings for timing such as for switched capacitor filters, ramp voltage values, or other settings), along with conventional system processing functions as would be understood by one skilled in the art.

Memory 104 comprises, in one embodiment, one or more memory devices adapted to store data and information, including for example infrared data and information. Memory 104 may comprise one or more various types of memory devices including volatile and non-volatile memory devices, and/or a machine-readable medium capable of storing data in a machine-readable format. Processor 106 may be adapted to execute software stored in memory 104 so as to perform method and process steps and/or operations described herein.

Network device 102 may include other components although not illustrated in the figures, such as detector components, optical components, a user interface, and so forth as will be further described below in conjunction with FIG. 4 in one example.

Network device 102 may perform the methods described above and below by a combination of hardware, firmware, and/or software utilizing memory 104, processor 106, and/or other components as necessary.

It is noted that in system 100, coupler 120 and loopback element 130 may be integrated into a single structure or may be operably coupled as an assembly of separable elements.

In accordance with one embodiment, network device 102 is configured to recognize in an incoming signal a unique packet (e.g., a loopback packet) which network device 102 transmitted as an outgoing signal for setting the network device to default settings.

In accordance with another embodiment, network device 102 is configured to compare incoming signals to outgoing signals, and to set the network device to default settings if an incoming signal is identical to an outgoing signal.

Accordingly, in one embodiment, network device 102 performs a check at each startup or boot up sequence for a particular network packet that the device itself transmits. Detection of the packet indicates that the device has been removed from a network and a loopback apparatus (or loopback element directly) was installed on a device network interface (e.g., an Ethernet interface). Detection of the loopback packet cues the network device to restore factory default settings and revert to a same configuration and behavior as when the device left the factory, in one example.

In another embodiment, as shown in system 150 of FIG. 1E, network device 102 may be operably coupled to any device that can propagate back the particular network packet that network device 102 itself transmits (e.g., a switch), and device 102 need not be removed from the network. Detection of the loopback packet then cues the network device to restore factory default settings and revert to a same configuration and behavior as when the device left the factory, in one example.

Advantageously, provision of default settings is achieved without the need for an external physical reset button on the device and/or direct access to the device, therefore reducing costs by not requiring a reset button and supporting circuitry for non-sealed devices, and by not requiring a sealed physical reset interface for sealed systems. Furthermore, the present disclosure is particularly useful for network devices that are installed in hard-to-access locations (e.g., security/surveillance camera locations), remote locations, and/or when the device is environmentally sealed. Furthermore, the present disclosure provides ease of reconfiguration and may be particularly useful for support in the field as a reset interface for networked devices.

Figure 2B:
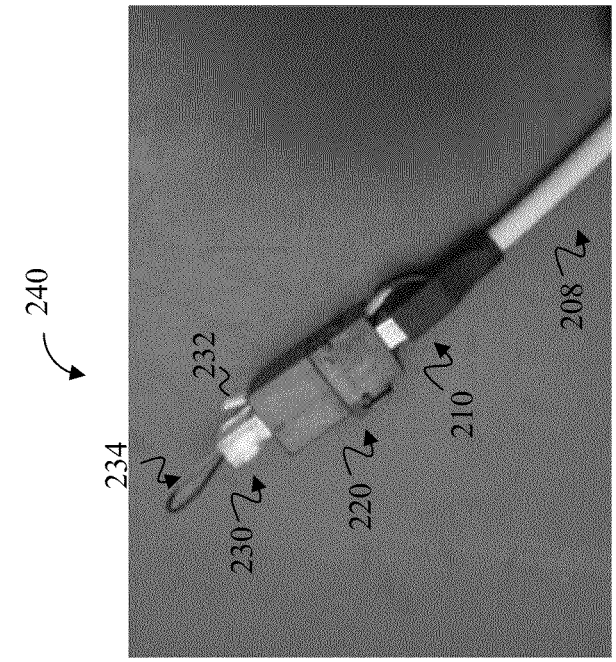
FIG. 2B illustrates an example of the assembled coupler and loopback element in accordance with an embodiment of the present disclosure.
Figure 2A:
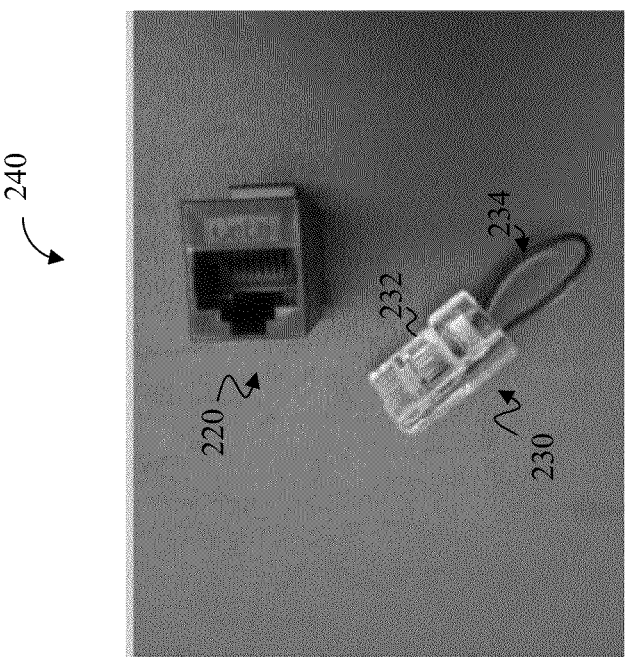
FIG. 2A illustrates an example of a loopback apparatus including a separable coupler and a separable loopback element in accordance with an embodiment of the present disclosure.

Referring now to FIGS. 2A and 2B in conjunction with FIGS. 1A and 1B, an example of a loopback apparatus 240 is illustrated in accordance with an embodiment of the present disclosure. FIG. 2A illustrates loopback apparatus 240 including a separable coupler 220 and a separable loopback element 230, and FIG. 2B illustrates an example of the assembled coupler 220 and loopback element 230 in accordance with an embodiment of the present disclosure. FIG. 2B further illustrates the loopback apparatus 240 coupled to a device network connector 210 (e.g., an Ethernet connector or RJ-45 plug) and a cable 208 that is operably coupled to a network device 102.

In one example, coupler 220 includes a female-female RJ-45 coupler configured to receive a network connector 210 (e.g., an RJ-45 connector or plug) of the network device 102 at a first interface (e.g., a first RJ-45 port) and the loopback element 230 at a second interface (e.g., a second RJ-45 port).

In one example, loopback element 230 includes a male RJ-45 connector including a plug 232 for interfacing with coupler 220 and a loopback termination 234 for returning an outgoing signal from network device 102 back to the network device through coupler 220 and network connector 210 to set the network device to default settings. In one example, loopback termination 234 may include two wires coupling pins of plug 232, although other types of electrical connection are within the scope of the present disclosure.

In alternative embodiments, coupler 220 and loopback element 230 may be integrated into a single structure which may be used to connect to device network connector 210. In other alternative embodiments, as with system 150 in FIG. 1B, loopback element 230 may be directly coupled to the network device (e.g., via a device RJ-45 port or Ethernet port) without a coupler and network connector.

Figure 3:
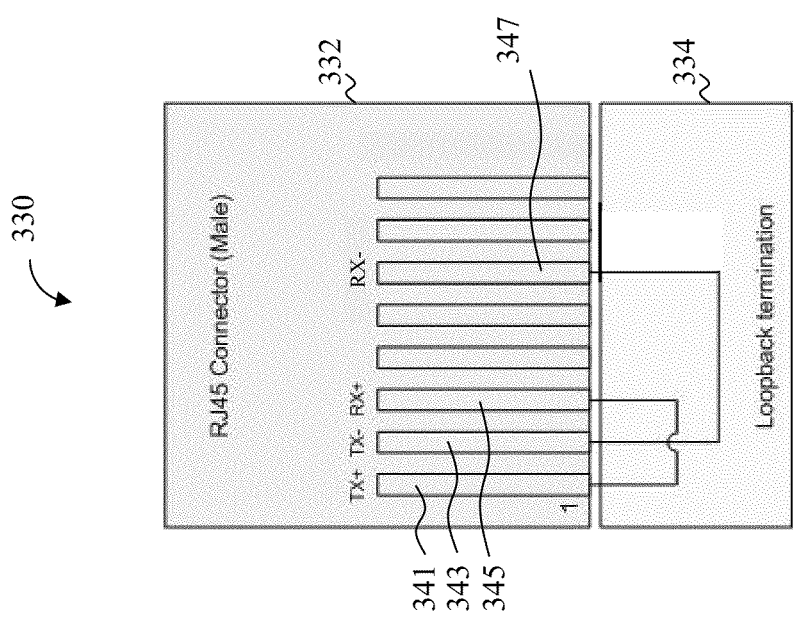
FIG. 3 illustrates a block diagram of a loopback element in accordance with an embodiment of the present disclosure.

Referring now to FIG. 3, a block diagram of a loopback element 330 is illustrated in accordance with an embodiment of the present disclosure. Loopback element 330 includes plug 332 and loopback termination 334. In one embodiment, plug 332 is a male RJ-45 plug having a TX+ pin 341 (e.g., a pin 1) coupled to a RX+ pin 345 (e.g., a pin 3) and a TX− pin 343 (e.g., a pin 2) coupled to a RX− pin 347 (e.g., a pin 6) by loopback termination 334. According to another embodiment, TX+ pin 341 is coupled to RX+ pin 345 by a first wire (e.g., one of wires of termination 234 in FIGS. 2A-2B) and TX− pin 343 is coupled to RX− pin 347 by a second wire (e.g., one of wires of loopback termination 234 in FIGS. 2A-2B). Other pins may be left the same or disconnected. Loopback termination 334 may include other types of electrical connection, such as metal lines, in other embodiments.

Figure 4:
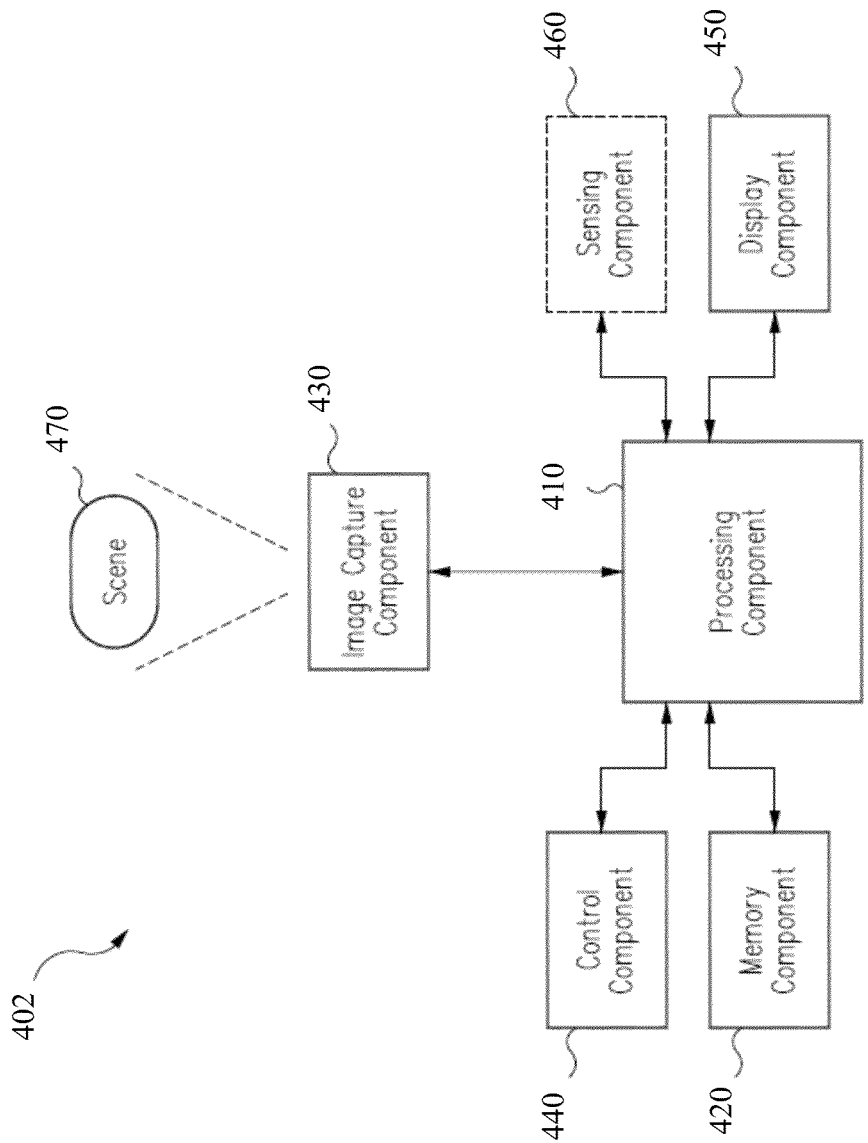
FIG. 4 illustrates a block diagram of an example network device in which may be set default settings in accordance with embodiments of the present disclosure.

Referring now to FIG. 4, a block diagram is shown illustrating a system 402 (e.g., an infrared camera) for capturing images and processing that can be set to default settings in accordance with one or more embodiments of the present disclosure. System 402 is one example of device 102 in one embodiment of the present disclosure and may have default settings applied to the device in accordance with the present disclosure. System 402 comprises, in one implementation, a processing component 410, a memory component 420, an image capture component 430, a control component 440, and/or a display component 450. System 402 may further include a sensing component 460.

System 402 may represent for example an infrared imaging device to capture and process images, such as video images of a scene 470. The system 402 may represent any type of infrared camera adapted to detect infrared radiation and provide representative data and information (e.g., infrared image data of a scene) or may represent more generally any type of electro-optical sensor system. In one example, system 402 may represent an infrared camera, a dual band imager such as a night vision imager, or an imager for sensing both short wave and long wave radiation simultaneously for providing independent image information. System 402 may comprise a portable device and may be incorporated, e.g., into a vehicle (e.g., an automobile or other type of land-based vehicle, an aircraft, a marine craft, or a spacecraft) or a non-mobile installation requiring infrared images to be stored and/or displayed or may comprise a distributed networked system.

In various embodiments, processing component 410 may comprise any type of a processor or a logic device (e.g., a programmable logic device (PLD) configured to perform processing functions). Processing component 410 may be adapted to interface and communicate with components 420, 430, 440, 450, and/or 460 to perform methods and processing steps and/or operations, as described herein such as setting or resetting device default settings, comparing outgoing signals with incoming signals, checking incoming signals for unique packets (e.g., loopback packets), controlling biasing and other functions (e.g., values for elements such as variable resistors and current sources, switch settings for timing such as for switched capacitor filters, ramp voltage values, or other settings), along with conventional system processing functions as would be understood by one skilled in the art.

Memory component 420 comprises, in one embodiment, one or more memory devices adapted to store data and information, including for example infrared data and information. Memory device 420 may comprise one or more various types of memory devices including volatile and non-volatile memory devices, and/or a machine-readable medium capable of storing data in a machine-readable format. Processing component 410 may be adapted to execute software stored in memory component 420 so as to perform method and process steps and/or operations described herein.

Image capture component 430 comprises, in one embodiment, any type of image sensor, such as for example one or more infrared sensors (e.g., any type of multi-pixel infrared detector) for capturing infrared image data (e.g., still image data and/or video data) representative of an image, such as scene 470. In one implementation, the infrared sensors of image capture component 430 provide for representing (e.g., converting) the captured image data as digital data (e.g., via an analog-to-digital converter included as part of the infrared sensor or separate from the infrared sensor as part of system 402). In one aspect, the infrared image data (e.g., infrared video data) may comprise non-uniform data (e.g., real image data) of an image, such as scene 470. Processing component 410 may be adapted to process the infrared image data (e.g., to provide processed image data), store the infrared image data in memory component 420, and/or retrieve stored infrared image data from memory component 420. For example, processing component 410 may be adapted to process infrared image data stored in memory component 420 to provide processed image data and information (e.g., captured and/or processed infrared image data).

Control component 440 comprises, in one embodiment, a user input and/or interface device. For example, the user input and/or interface device may represent a rotatable knob (e.g., potentiometer), push buttons, slide bar, keyboard, or other device, that is adapted to generate a user input control signal. Processing component 410 may be adapted to sense control input signals from a user via control component 440 and respond to any sensed control input signals received therefrom. Processing component 410 may be adapted to interpret such a control input signal as a parameter value, as generally understood by one skilled in the art.

In one embodiment, control component 440 may comprise a control unit (e.g., a wired or wireless handheld control unit) having push buttons adapted to interface with a user and receive user input control values. In one implementation, the push buttons of the control unit may be used to control various functions of the system 402, such as autofocus, menu enable and selection, field of view, brightness, contrast, noise filtering, high pass filtering, low pass filtering, and/or various other features as understood by one skilled in the art. In one embodiment, control component 440 may not include a factory reset button.

Display component 450 comprises, in one embodiment, an image display device (e.g., a liquid crystal display (LCD) or various other types of generally known video displays or monitors). Processing component 410 may be adapted to display image data and information on the display component 450. Processing component 410 may be adapted to retrieve image data and information from memory component 420 and display any retrieved image data and information on display component 450. Display component 450 may comprise display electronics, which may be utilized by processing component 410 to display image data and information (e.g., infrared images). Display component 450 may be adapted to receive image data and information directly from image capture component 430 via the processing component 410, or the image data and information may be transferred from memory component 420 via processing component 410.

Sensing component 460 comprises, in one embodiment, one or more sensors of various types, depending on the application or implementation requirements, as would be understood by one skilled in the art. The sensors of optional sensing component 460 provide data and/or information to at least processing component 410. In one aspect, processing component 410 may be adapted to communicate with sensing component 460 (e.g., by receiving sensor information from sensing component 460) and with image capture component 430 (e.g., by receiving data and information from image capture component 430 and providing and/or receiving command, control, and/or other information to and/or from one or more other components of system 402).

In various implementations, sensing component 460 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 460 may represent conventional sensors as generally known by one skilled in the art for monitoring various conditions (e.g., environmental conditions) that may have an effect (e.g., on the image appearance) on the data provided by image capture component 430.

In some implementations, optional sensing component 460 (e.g., one or more of sensors) may comprise devices that relay information to processing component 410 via wired and/or wireless communication. For example, optional sensing component 460 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of system 402 may be combined and/or implemented or not, as desired or depending on the application or requirements, with system 402 representing various functional blocks of a related system. In one example, processing component 410 may be combined with memory component 420, image capture component 430, display component 450, and/or optional sensing component 460. In another example, processing component 410 may be combined with image capture component 430 with only certain functions of processing component 410 performed by circuitry (e.g., a processor, a microprocessor, a logic device, a microcontroller, or other circuitry) within image capture component 430. Furthermore, various components of system 402 may be remote from each other (e.g., image capture component 430 may comprise a remote sensor with processing component 410 or other components representing a computer that may or may not be in communication with image capture component 430).

Figure 5:
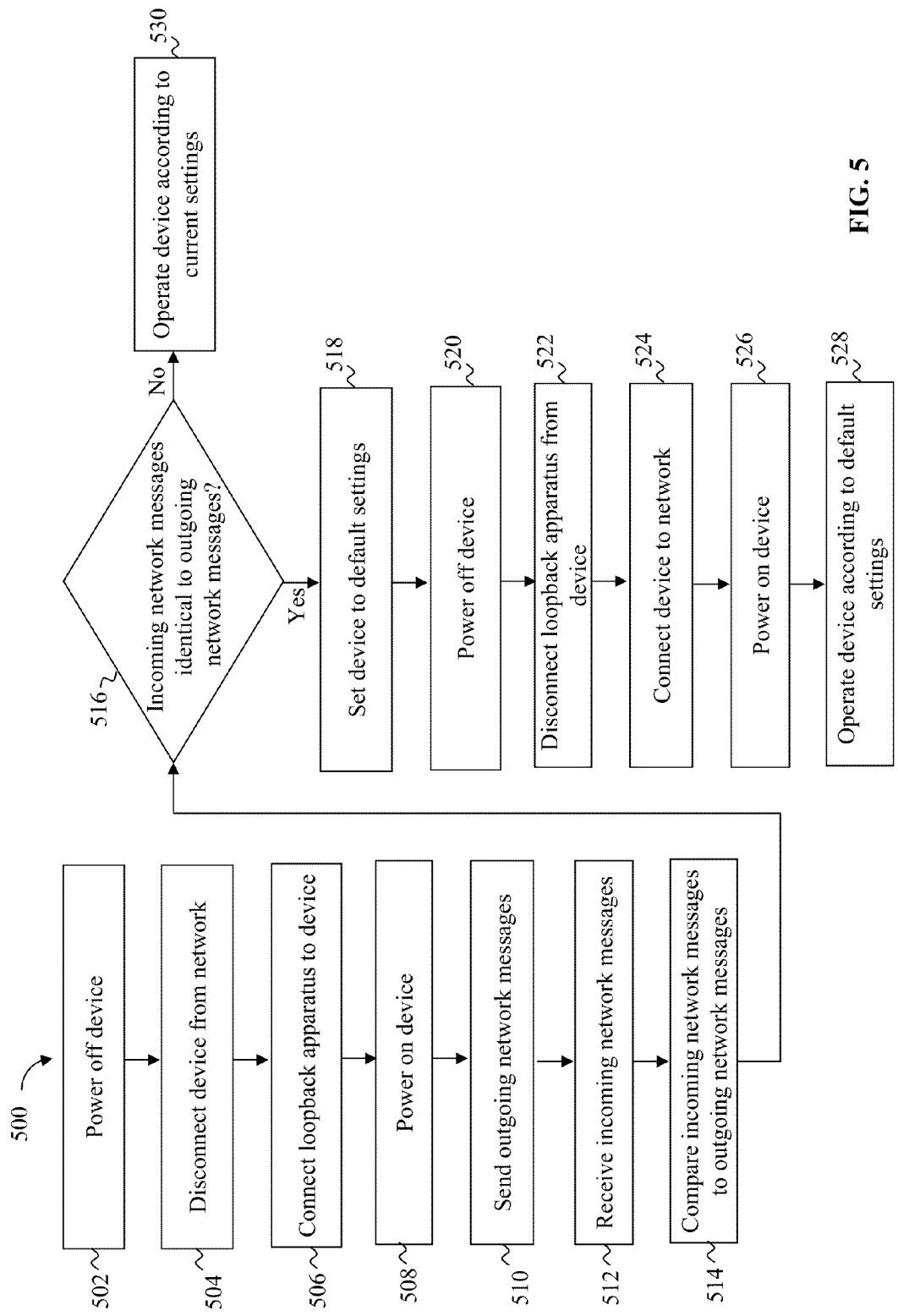
FIG. 5 illustrates a flowchart showing a method of setting or resetting a network device to default settings in accordance with an embodiment of the present disclosure.

Referring now to FIG. 5, a flowchart shows a method 500 of setting or resetting a network device (e.g., network device 102, system 402, or other devices) to default settings in accordance with an embodiment of the present disclosure. At block 502, a network device is powered off (e.g., by switching off a power switch or removing a power supply) if the device is on. At block 504, the network device is disconnected from a network (e.g., via disconnecting network connector 110, 210 from network interface 112) if the device is connected to the network. At block 506, a loopback apparatus (e.g., loopback apparatus 140, 240) is connected to the network device (e.g., via network connector 110, 210). In alternative embodiments, a loopback element (e.g., loopback element 130, 230) is directly connected to the network device (e.g., as a temporary connection) and the network device need not be disconnected from the network. In such an embodiment, block 504 would not be needed.

At block 508, the network device is powered on, and at block 510, the network device (e.g., via processor 106 or processing component 410) sends an outgoing network message (e.g., through network connector 110 to loopback apparatus 140, 240 or directly to loopback apparatus 140, 240). At block 512, the network device receives incoming network messages, and at block 514, the network device compares the incoming network messages to outgoing network messages.

At decision block 516, the network device (e.g., via processor 106 or processing component 410) determines whether the incoming network messages are identical to the outgoing network messages. If the incoming network messages are determined to be identical to the outgoing network messages (i.e., the decision is "yes"), at block 518 the network device is set to default settings, such as factory default settings. The network device settings may be reset to the factory default settings at this step in one embodiment.

At block 520 the network device is powered off. Then, at block 522 the loopback apparatus is disconnected from the network device (e.g., disconnecting coupler 120 from network connector 110 or directly disconnecting loopback element 130 from device 102). In alternative embodiments, the loopback element is disconnected from the network device. At block 524, the network device is connected to the network (e.g., via connecting network connector 110, 210 to network interface 112). At block 526, the device is powered on, and at block 528, the device is operated according to the default settings set at block 518. In alternative embodiments, as noted above, if the loopback apparatus is directly connected to the network device without disconnection of the network device from the network, block 524 would not be needed.

If the incoming network messages are determined to not be identical to the outgoing network messages at decision block 516 (i.e., the decision is "no"), at block 530 the network device may be operated according to current settings without resetting to default settings.

Figure 6:
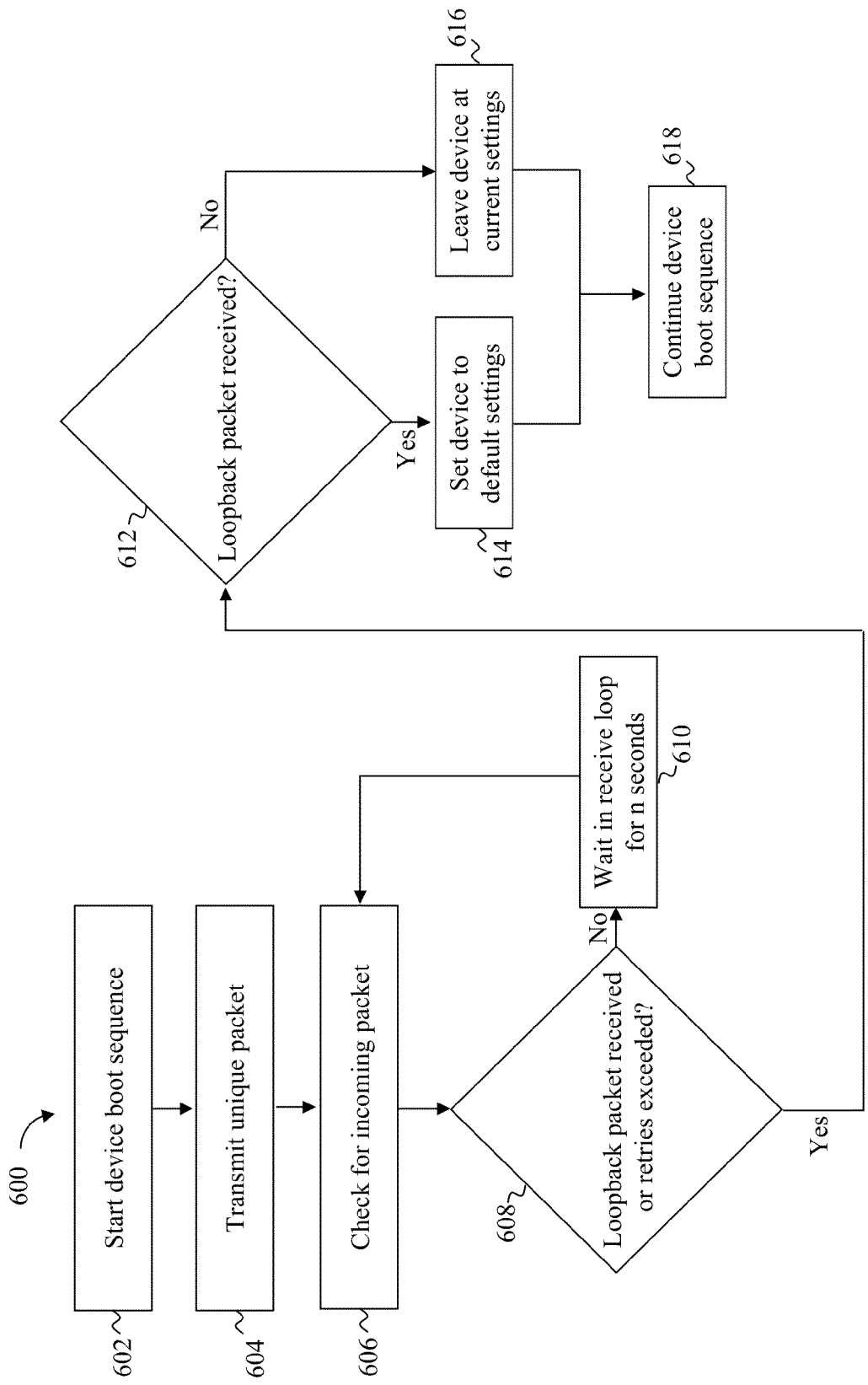
FIG. 6 illustrates a flowchart showing a method of setting or resetting a network device to default settings in accordance with another embodiment of the present disclosure.

Referring now to FIG. 6, a flowchart shows a method 600 of setting or resetting a network device (e.g., network device 102) to default settings in accordance with another embodiment of the present disclosure. At block 602, the network device starts a boot sequence, and at block 604, a unique packet is transmitted in an outgoing signal through a network connector (e.g., network connector 112). At block 606, the network device checks for received or incoming packets.

At decision block 608, the network device (e.g., via processor 106 or processing component 410) determines whether the unique packet transmitted at block 604 has been received via a loopback apparatus (e.g., loopback apparatus 140, 240) or whether a number of checks for the unique packet has been exceeded. If the decision at decision block 608 is "no", then at block 610 the network device waits in a receive loop for "n" seconds and loops back to block 606 to check for an incoming packet. The "n" seconds may be set by a user in one embodiment. If the decision at decision block 608 is "yes", then at decision block 612 the network device determines whether a loopback packet has been received (i.e., whether the unique packet transmitted at block 604 has been received back at the network device). If the decision at decision block 612 is "no", then the device is left at current settings at block 616. In one example, the instruction "ipdefaults=FALSE" may be added to a command line at block 616. If the decision at decision block 612 is "yes", then the device is set to default settings at bock 614. In one example, the instruction "ipdefaults=TRUE" may be added to a command line at block 614. Subsequently, the loopback apparatus is disconnected from the network device (e.g., disconnecting coupler 120 from network connector 110 or directly disconnecting loopback element 130 from device 102). At block 618, the device continues the device boot sequence.

Accordingly, in one embodiment, the unique packet transmitted at block 604 triggers or sets the network device to default settings once the unique packet has been received back at the network device in an incoming message or signal. In one embodiment, incoming signals are compared to outgoing signals, and the network device is set to default settings if an incoming signal is identical to an outgoing signal.

Once the network device has been set to default settings, the loopback apparatus is disconnected from the network connector, and the network device is connected to the network (if previously disconnected) and operated according to the default settings.

If a unique packet for setting the network device to default settings is not received or if an incoming signal is not identical to an outgoing signal, the network device is operated according to current settings.

According to various aspects of the present disclosure, a display (e.g., display component 450) and a processor (e.g., processor 106, or processing component 410) of a network device may be adapted to display image data and/or information on the display as a user interface to communicate network device status and/or to provide instructions to the user for any of the method steps for setting a network device to default settings as described above. For example, the display of the network device may provide a network device status, such as: when the network device has detected a loopback apparatus, a loopback element, and/or a loopback packet; when the network device has been reset to default settings; when the network device is operating under current settings; and/or various other system status updates. The display of the network device may also provide instructions for setting the network device to default settings, such as: when to remove the loopback apparatus or loopback element; when to reconnect the device to a network; and/or any of the various method steps as described above.

In view of the present disclosure, it will be appreciated that apparatus, systems, and methods as set forth herein allow for the improved setting of default settings on a network device. Such an approach can significantly reduce costs while maintaining simplicity and efficiency. It will further be appreciated that the apparatus, systems, and methods as set forth herein can be applied to any appropriate technology or device employing network connectors and interfaces and where it is desirable for the device to be set or reset to default settings. Advantageously, the apparatus, systems, and methods as set forth herein allow for the provision of default settings without requiring a reset factory default button or mechanism, thereby reducing costs and/or providing access to enclosed devices.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A network device, comprising:
   a memory; and
   a processor configured to:
      transmit an outgoing signal through a network connector;
      receive the outgoing signal via the network connector; and
      set the network device to default settings after receiving the outgoing signal.

2. The device of claim 1, wherein the processor is further configured to check whether the received outgoing signal is a unique packet for setting the network device to default settings.

3. The device of claim 1, wherein the processor is further configured to:
   compare incoming signals to outgoing signals; and
   set the network device to default settings if an incoming signal is identical to an outgoing signal.

4. The device of claim 1, further comprising:
   a loopback element configured to return the outgoing signal back to the network device to set the network device to default settings.

5. The device of claim 4, further comprising:
   a coupler including a female-female RJ-45 coupler configured to receive the network connector of the network device at a first interface and the loopback element at a second interface.

6. The device of claim 4, wherein the loopback element is a male RJ-45 connector having a TX+ pin coupled to a RX+ pin and a TX− pin coupled to a RX− pin.

7. A system for setting a network device to default settings, the system comprising:
   a network device including a network connector for connecting to a network; and
   a loopback element configured to return an outgoing signal from the network device back to the network device,
   wherein the network device is configured to receive the returned outgoing signal from the loopback element and to subsequently set the network device to default settings.

8. The system of claim 7, wherein the loopback element is a male RJ-45 connector having a TX+ pin coupled to a RX+ pin and a TX− pin coupled to a RX− pin.

9. The system of claim 7, further comprising a coupler adapted to operably interface with the network connector and the loopback element.

10. The system of claim 9, wherein the coupler is a female-female RJ-45 coupler configured to receive the network connector of the network device at a first interface and the loopback element at a second interface.

11. The system of claim 9, wherein the coupler and the loopback element are integrated into a single structure or are coupled as an assembly of separable elements.

12. The system of claim 7, wherein the network connector is a male RJ-45 connector.

13. The system of claim 7, wherein the network includes one of the Internet, a cellular network, a local area network (LAN), and a wide area network (WAN).

14. The system of claim 7, wherein the network device is configured to recognize a unique packet in an incoming signal for setting the network device to default settings.

15. The system of claim 7, wherein the network device is configured to compare incoming signals to outgoing signals, and to set the network device to default settings if an incoming signal is identical to an outgoing signal.

16. A method for setting a network device to default settings, the method comprising:
   transmitting an outgoing signal from a network device;
   receiving the outgoing signal back at the network device via a loopback element; and
   setting the network device to default settings after receiving the outgoing signal at the network device.

17. The method of claim 16, further comprising:
   checking whether the received outgoing signal is a unique packet for setting the network device to default settings.

18. The method of claim 16, further comprising:
   comparing incoming signals to outgoing signals; and
   setting the network device to default settings if an incoming signal is identical to an outgoing signal.

19. The method of claim 16, further comprising:
   connecting the loopback apparatus to the network connector;
   disconnecting the loopback apparatus from the network connector after the network device has been set to default settings;
   connecting the network connector to a network; and
   operating the network device according to default settings.

20. The method of claim 16, further comprising:
   operating the network device according to current settings if a unique packet for setting the network device to default settings is not received or if an incoming signal is not identical to an outgoing signal.

* * * * *